(12) United States Patent
Okazaki et al.

(10) Patent No.: US 11,263,768 B2
(45) Date of Patent: Mar. 1, 2022

(54) 3D INFORMATION CALCULATION APPARATUSES, 3D MEASUREMENT APPARATUSES, 3D INFORMATION CALCULATION METHODS, AND 3D INFORMATION CALCULATION PROGRAMS

(71) Applicant: Samsung Electronics Co., Ltd., Suwon-si (KR)

(72) Inventors: Takashi Okazaki, Yokohama (JP); Mineki Taoka, Yokohama (JP)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 232 days.

(21) Appl. No.: 16/720,839

(22) Filed: Dec. 19, 2019

(65) Prior Publication Data

US 2020/0202546 A1 Jun. 25, 2020

(30) Foreign Application Priority Data

Dec. 20, 2018 (JP) .............................. JP2018-237991

(51) Int. Cl.
*G06K 9/00* (2006.01)
*G06T 7/593* (2017.01)
(Continued)

(52) U.S. Cl.
CPC ........... *G06T 7/596* (2017.01); *H04N 13/139* (2018.05); *G06T 2207/10048* (2013.01); *G06T 2207/20224* (2013.01); *H04N 2013/0081* (2013.01)

(58) Field of Classification Search
CPC ...... G06K 9/4609; G06K 9/48; G06K 9/6407; G06K 9/6423; G06K 9/6476;
(Continued)

(56) References Cited

U.S. PATENT DOCUMENTS 5,754,280 A * 5/1998 Kato ..................... G01S 17/894
356/3.06
8,102,426 B2 * 1/2012 Yahav ..................... G01S 17/14
348/207.99

(Continued)

FOREIGN PATENT DOCUMENTS

| JP | 2011169701 A | 9/2011 |
| JP | 5587756 B2 | 9/2014 |

(Continued)

*Primary Examiner* — Amir Alavi
(74) *Attorney, Agent, or Firm* — Harness, Dickey & Pierce, P.L.C.

(57) ABSTRACT

A 3D information calculation apparatus includes processing circuitry that may receive first and second images of different first and second wavelength bands, respectively, at a same time and angle of view based on a subject being imaged while structured light of the first wavelength band is projected on to subject, receive third and fourth images of the first and second wavelength bands, respectively, at a same time and angle of view based on the subject being imaged while the structured light is not projected on the subject, calculate a first difference image of the first wavelength band based on subtracting the first and third images, calculate a second difference image of the second wavelength band based on subtracting the second and fourth (Continued)

images, calculate an extraction image based on subtracting the first and second difference images, and calculate a distance to the subject based on the extraction image.

20 Claims, 7 Drawing Sheets

(51) Int. Cl.
    *H04N 13/139*     (2018.01)
    *H04N 13/00*     (2018.01)

(58) Field of Classification Search
    CPC . G06K 9/00084; G06T 7/0075; G06T 7/0022; G06T 7/0083; G06T 7/596; G06T 2207/10012; G06T 2207/10016; H04N 13/0239; H04N 13/0082; G02B 6/10; G02B 6/12; G02B 6/122; G02B 6/34; G02B 6/124; G02B 5/18; G02F 1/29; G01S 17/89; G01S 7/4811; G01S 7/4817
    See application file for complete search history.

(56) References Cited

U.S. PATENT DOCUMENTS

| | | | |
|---|---|---|---|
| 8,213,022 B1 * | 7/2012 | Riza | G01B 11/24 |
| | | | 356/609 |
| 8,334,894 B2 | 12/2012 | Pfeiffer et al. | |
| 8,681,321 B2 * | 3/2014 | Pel | H04N 5/2354 |
| | | | 356/5.01 |
| 9,417,059 B2 * | 8/2016 | Go | G01S 7/4817 |
| 9,448,162 B2 * | 9/2016 | Zhai | G01S 7/4816 |
| 10,175,360 B2 * | 1/2019 | Zweigle | G01S 17/42 |
| 10,240,915 B2 | 3/2019 | Fuchikami | |
| 10,321,114 B2 * | 6/2019 | Lin | G06T 7/80 |
| 10,353,055 B2 * | 7/2019 | Moon | G01S 17/08 |
| 10,362,292 B2 * | 7/2019 | Xie | G02B 6/12 |
| 10,571,256 B2 * | 2/2020 | Li | G06T 7/73 |
| 2013/0038882 A1 | 2/2013 | Umeda et al. | |
| 2019/0204419 A1 * | 7/2019 | Baba | G01S 17/89 |

FOREIGN PATENT DOCUMENTS

| | | |
|---|---|---|
| JP | 2016008838 A | 1/2016 |
| JP | 2018040760 A | 3/2018 |

\* cited by examiner

3D INFORMATION CALCULATION APPARATUSES, 3D MEASUREMENT APPARATUSES, 3D INFORMATION CALCULATION METHODS, AND 3D INFORMATION CALCULATION PROGRAMS

CROSS-REFERENCE TO RELATED APPLICATION

This application claims priority to and the benefit of, under 35 U.S.C. § 119, Japanese Patent Application No. 2018-237991 filed in the Japan Patent Office on Dec. 20, 2018, the entire contents of which are incorporated herein by reference.

BACKGROUND

(a) Field

The described technology generally relates to three-dimensional (3D) information calculation apparatuses, 3D measurement apparatuses, 3D information calculation methods, and/or non-transitory computer readable mediums storing 3D information calculation programs.

(b) Description of the Related Art

Various 3D measurement techniques using light have been developed. The 3D measurement technologies include, for example, a stereo vision method of measuring a distance based on a parallax of images taken by a plurality of cameras, and a time of flight (ToF) method of measuring a distance based on a time or phase from emitting light to receiving the light reflected from an object. There is also a structured light method of measuring a distance, after projecting and imaging a particular (or, alternatively, predetermined) pattern, based on where the projected pattern is located in a captured image.

In the structured light method, the particular (or, alternatively, predetermined) pattern is projected onto a subject from the projector and imaged by an image sensor. Based on a difference between a position of the particular (or, alternatively, predetermined) pattern emitted from the projector and an actual position of the projected pattern in the captured image, the distance to the subject is calculated by using a triangulation method.

For example, Japanese Patent Application Publication No. 2011-169701 discloses a method of subtracting an image captured when structured light is not projected from an image captured when the structured light is projected by a 3D measurement apparatus, thereby removing a noise component due to light (e.g., ambient light) other than the structured light.

However, it is required to perform the imaging twice, i.e., when the structured light is projected and when the structured light is not projected, to obtain 3D information. In some example embodiments, if the subject moves between the twice imaging, the position of the subject varies in the two captured images. Further, if one captured image is subtracted from the other captured image when the position of the subject is different in the two captured images, the influence of the ambient light cannot be sufficiently excluded, and an error occurs in the calculated 3D information (distance information) of the subject.

SUMMARY

Example embodiments provide a three-dimensional (3D) information calculation apparatus, a 3D measurement apparatus, a 3D information calculation method, and/or a non-transitory computer readable medium storing a 3D information calculation program, for excluding the influence of ambient light and compensating for a difference in images caused by a movement of a subject or a camera shake, thereby accurately measuring a distance to the subject. Said accurate measurement of distance to a subject may be used for various applications, including being used to adjust a focus of a camera based on the measured distance, being used to navigate a device and/or vehicle through an environment in relation to the subject, or the like.

According to some example embodiments, a 3D information calculation apparatus may include processing circuitry. The processing circuitry may be configured to receive a first image of a first wavelength band and a second image of a second wavelength band different from the first wavelength band at a same time and a same angle of view, the first image and the second image being received based on a subject being imaged concurrently with structured light of the first wavelength band being projected on to the subject, receive a third image of the first wavelength band and a fourth image of the second wavelength band at a same time and a same angle of view, the third image and the fourth image being received based on the subject being imaged concurrently with the structured light not being projected on to the subject, calculate a first difference image of the first wavelength band based on subtracting the first image and the third image, calculate a second difference image of the second wavelength band based on subtracting the second image and the fourth image, calculate an extraction image based on subtracting the first difference image and the second difference image, and calculate a distance to the subject based on the extraction image.

According to some example embodiments, a 3D measurement apparatus may include a projection device, an imaging device, and processing circuitry. The projection device may project structured light of a first wavelength band onto a subject. The imaging device may capture a first image of a first wavelength band and a second image of a second wavelength band different from the first wavelength band at a same time and a same angle of view concurrently with the structured light being projected onto the subject, and capture a third image of the first wavelength band and a fourth image of the second wavelength band at a same time and a same angle of view concurrently with the structured light being not projected onto the subject. The processing circuitry may calculate a first difference image of the first wavelength band based on subtracting the first image and the third image, calculate a second difference image of the second wavelength band based on subtracting the second image and the fourth image, calculate an extraction image based on subtracting the first difference image and the second difference image, and calculate a distance to the subject based on the extraction image.

According to some example embodiments of the present inventive concepts, a 3D information calculation method performed by a computing device is provided. The 3D information calculation method may include receiving a first image of a first wavelength band and a second image of a second wavelength band different from the first wavelength band at a same time and a same angle of view, the first image and the second image being received based on a subject being imaged concurrently with structured light of the first wavelength band being projected on to the subject, capturing a third image of the first wavelength band and a fourth image of the second wavelength band at a same time and a same angle of view, the third image and the fourth image being received based on the subject being imaged concurrently with the structured light not being projected on to the subject, calculating a first difference image of the first wavelength band based on subtracting the first image and the third image, calculating a second difference image of the second wavelength band based on subtracting the second image and the fourth image, calculating an extraction image based on subtracting the first difference image and the second difference image, and calculating a distance to the subject based on the extraction image.

According to some example embodiments of the present inventive concepts, a non-transitory computer readable medium storing a 3D information calculation program is provided. The 3D information calculation program, when executed by a computing device, may cause the computing device to receive a first image of a first wavelength band and a second image of a second wavelength band different from the first wavelength band at a same time and a same angle of view, the first image and the second image being received based on a subject being imaged concurrently with structured light of the first wavelength band being projected on to the subject, receive a third image of the first wavelength band and a fourth image of the second wavelength band at a same time and a same angle of view, the third image and the fourth image being received based on the subject being imaged concurrently with the structured not being projected on to the subject, calculate a first difference image of the first wavelength band based on subtracting the first image and the third image, calculate a second difference image of the second wavelength band based on subtracting the second image and the fourth image, calculate an extraction image based on subtracting the first difference image and the second difference image, and calculate a distance to the subject based on the extraction image.

DETAILED DESCRIPTION

Figure 1:
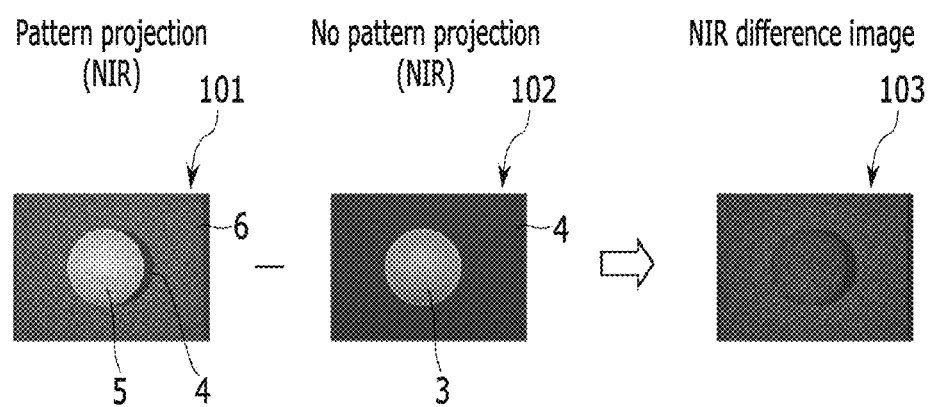
FIG. 1 is a diagram for explaining a subtraction process of two captured images in a case that a subject does not move between imaging when structured light is projected and imaging when the structured light is not projected, according to some example embodiments.

In the following detailed description, only certain example embodiments have been shown and described, simply by way of illustration. As those skilled in the art would realize, the described example embodiments may be modified in various different ways, all without departing from the spirit or scope thereof. Accordingly, the drawings and description are to be regarded as illustrative in nature and not restrictive. Like reference numerals designate like elements throughout the specification.

Before describing a 3D information calculation apparatus and a 3D information calculation method according to example embodiments, as a comparative example, a problem, which occurs in a case that a subject moves between imaging when structured light is projected and imaging when the structured light is not projected, is described by using an actual image.

FIG. 1 is a diagram for explaining a subtraction process of two captured images in a case that a subject does not move between imaging when structured light is projected and imaging when the structured light is not projected, according to some example embodiments. The image is captured based on projecting the structured light (hereinafter referred to as "pattern light") in a near-infrared wavelength from a projector on the left of a camera that is configured to perform imaging in a near-infrared wavelength. Capturing an image of a subject may be referred to herein as "imaging" the subject.

In an image 101 when the pattern light is projected, a sphere 5 on which the pattern is projected appears in front of a wall 6 on which the pattern is projected. A coarse part in the image 101 is the projected pattern. Further, a wall 4 on which the pattern is not projected by the shade of the sphere 5 appears on the right side of the sphere 5 on which the pattern is projected.

In an image 102 when the pattern light is not projected, a sphere 3 on which the pattern is not projected appears in front of a wall 4 on which the pattern is not projected.

In a near-infrared difference image 103 obtained based on subtracting the image 102 when the pattern light is not projected from the image 101 when the pattern light is projected, the luminance of the sphere 3 is canceled so that the pattern can be easily extracted based on a binarization process. Further, a distance to the sphere 3 or the wall 4 can be easily calculated based on applying a triangulation method to the extracted pattern.

Figure 2:
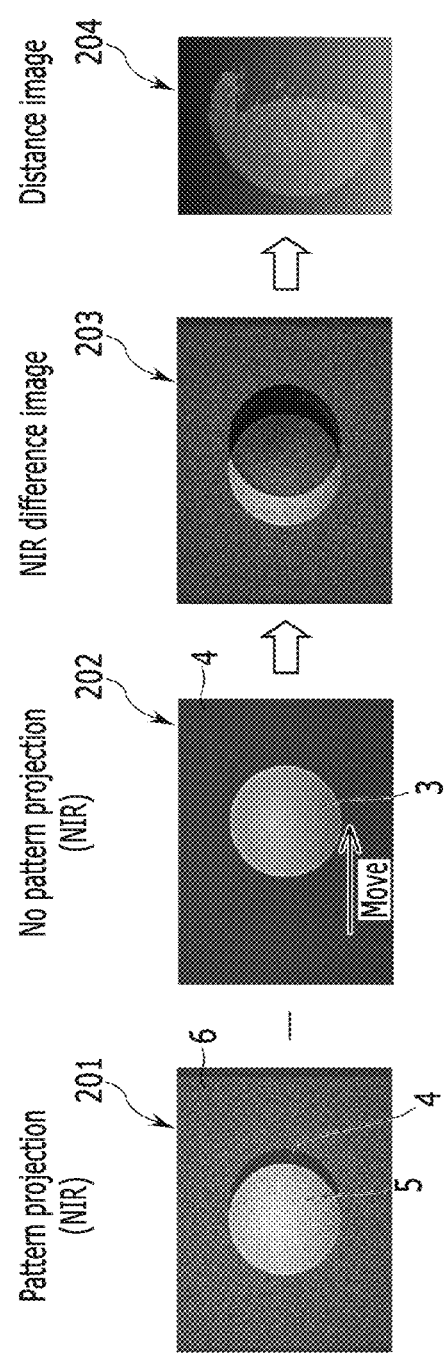
FIG. 2 is a diagram for explaining a subtraction process of two captured images in a case that a subject moves between imaging when structured light is projected and imaging when the structured light is not projected, according to some example embodiments.

FIG. 2 is a diagram for explaining a subtraction process of two captured images in a case that a subject moves between imaging when structured light is projected and imaging when the structured light is not projected, according to some example embodiments. The projecting and imaging conditions are the same as those in FIG. 1.

A sphere 3 moves from left to right in front of a camera during a period from a time at capturing an image 201 when a pattern light is projected to a time at capturing an image 202 when the pattern light is not projected.

Therefore, in a near-infrared difference image 203 obtained based on subtracting the image 202 when the pattern light is not projected from the image 201 when the pattern light is projected, an unnecessary luminance difference appears in the background of the pattern so that a threshold value for a binarization process cannot be appropriately set. Therefore, the pattern cannot be properly extracted based on the binarization process. Further, even if a triangulation method is applied to the extracted pattern, a 3D shape of the subject cannot be accurately reconstructed. Furthermore, the sphere 3 cannot be properly reconstructed in a distance image 204 calculated from the near-infrared difference image 203.

A 3D information calculation apparatus and a 3D information calculation method according to example embodiments may acquire a near-infrared image and a visible light image when a pattern light (also referred to herein as structured light) is projected, and a near-infrared image and a visible light image when the pattern light is not projected, using an imaging device that can capture a near-infrared image and a visible light image at the same time and the same angle of view, and accurately calculate a distance to a subject based on excluding the influence of ambient light and compensating for an image difference due to a movement of the subject or a camera shake.

Next, a 3D calculation apparatus and a 3D information calculation method according to some example embodiments are described with reference to the drawings.

First, a 3D information calculation apparatus according to some example embodiments is described based on a 3D measurement apparatus that includes the 3D information calculation apparatus as a 3D information calculation unit.

Figure 3:
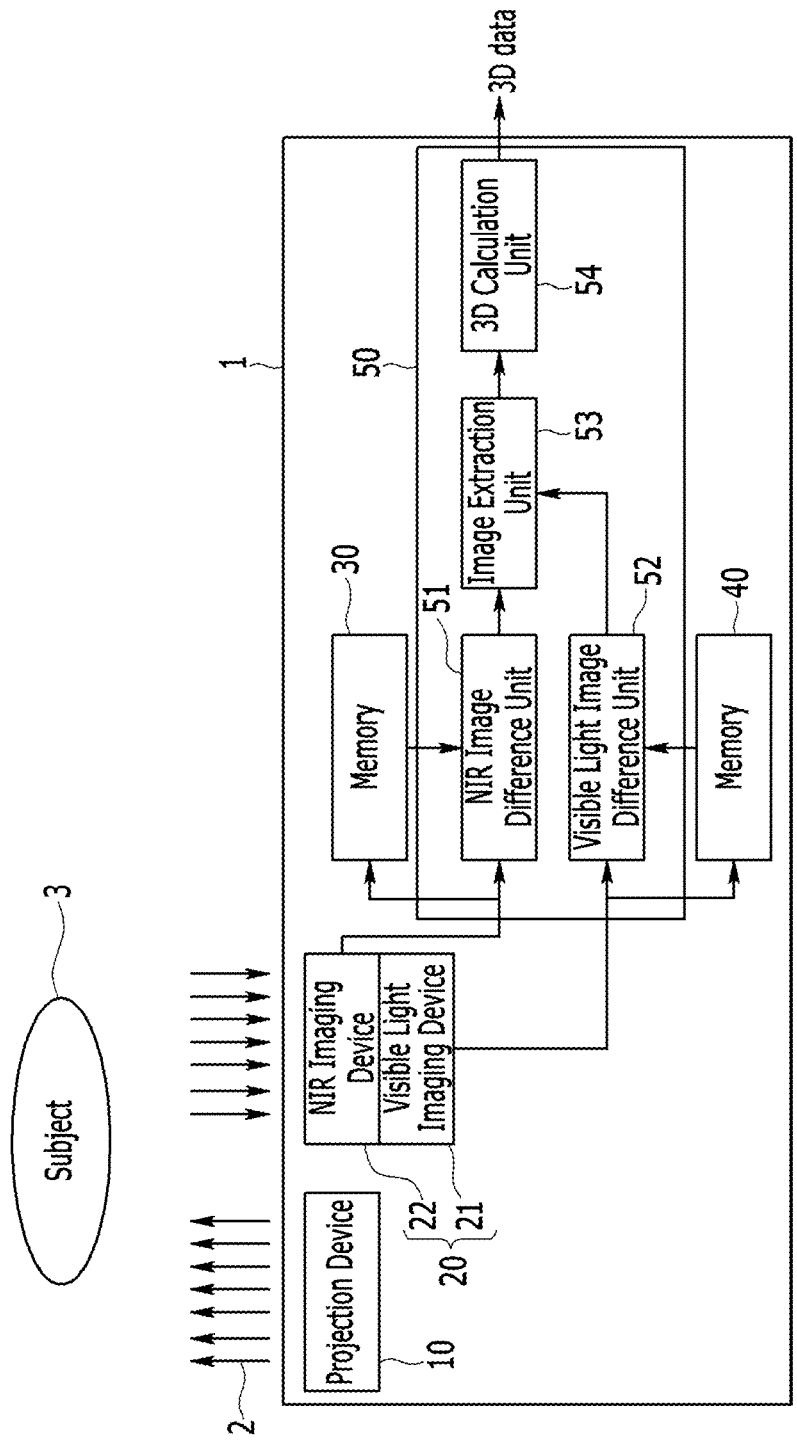
FIG. 3 is a schematic block diagram showing a 3D measurement apparatus according to some example embodiments.

FIG. 3 is a schematic block diagram showing a 3D measurement apparatus 1 according to some example embodiments.

Referring to FIG. 3, the 3D measurement apparatus 1 includes a projection unit 10, an imaging unit 20, memories 30 and 40, and a 3D information calculation unit 50. In some example embodiments, the 3D measurement apparatus 1 may be, for example, a smartphone.

The projection unit (i.e., a projection device) 10 is a projector that is configured to project structured light 2 of a first wavelength band (e.g., a near-infrared wavelength band) onto a subject 3 (e.g., a sphere). The structured light 2 may be, for example, laser light having a narrow wavelength width, and may use a pattern capable of identifying that the structured light is emitted from which positions of the projection unit 10. In some example embodiments, the pattern may be, for example, a well-known random dot pattern.

The imaging unit 20 (i.e., an imaging device and/or image sensor) is an imaging device that is configured to capture images in a first (e.g., near-infrared) wavelength band (hereinafter referred to as "near-infrared images") and images in a second (e.g., visible light) wavelength band (hereinafter referred to as a "visible light images") at the same time and the same angle of view when pattern light 2 is projected onto the subject 3 (e.g., concurrently with the pattern light 2 being projected onto the subject) and when the pattern light 2 is not projected onto the subject 3 (e.g., concurrently with the pattern light 2 not being projected onto the subject). In some example embodiments, the imaging unit 20 may convert the visible light image into a gray scale image after the imaging. To this end, in some example embodiments, the imaging unit 20 may include a visible light imaging device 21 that is configured to perform the imaging in the visible light wavelength band and a near-infrared imaging device 22 that is stacked on the visible light imaging device 21 and performs the imaging in the near-infrared wavelength band.

Figure 4:
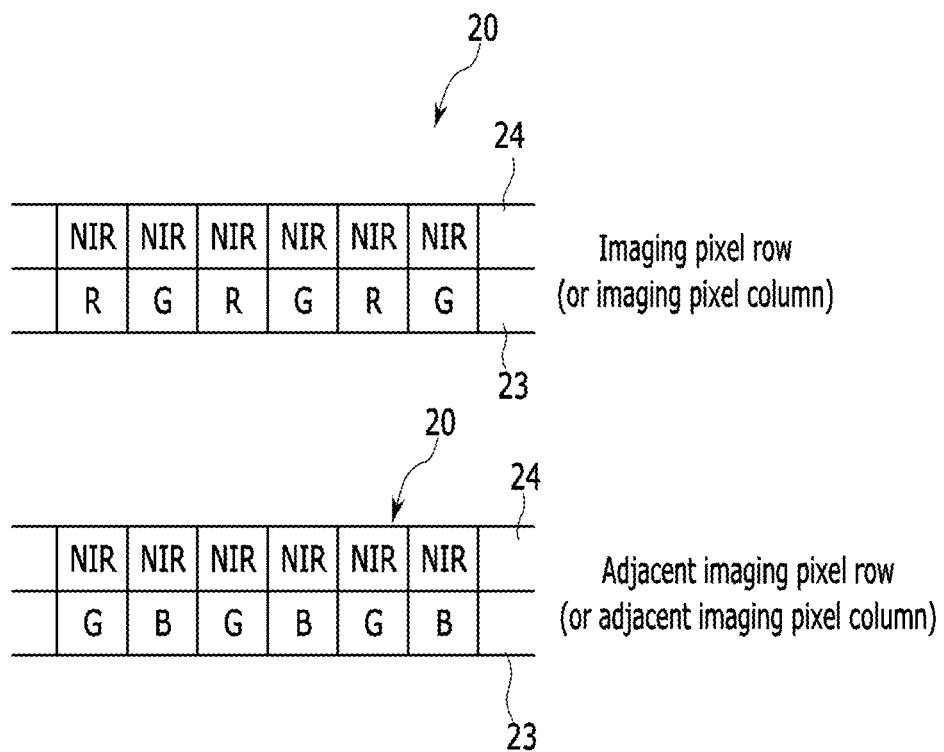
FIG. 4 is a diagram for explaining an imaging unit according to some example embodiments.

FIG. 4 is a diagram for explaining an imaging unit 20 according to some example embodiments. FIG. 4 is a cross section when an imaging pixel row (or imaging pixel column) of the imaging unit 20 and an imaging pixel row (or imaging pixel column) adjacent thereto are viewed from a direction perpendicular to a stacking direction of the imaging unit 20.

Near-infrared (NIR) imaging pixels 24 are stacked on RGB visible light imaging pixels (i.e., red ("R") imaging pixels, green ("G") imaging pixels, and blue ("B") imaging pixels) 23 arranged in a Bayer array, respectively. In some example embodiments, the R imaging pixel, the G imaging pixel, and the B imaging pixel may be imaging pixels including photoelectric conversion units, which perform imaging in a red wavelength band, a green wavelength band and a blue wavelength band, respectively. The NIR imaging pixel 24 may be an imaging pixel including a photoelectric conversion unit that is configured to perform imaging in a near-infrared wavelength band, for example, of 800 nm to 1000 nm. In some example embodiments, in the imaging unit 20, a lower layer may be formed of, for example, a semiconductor material such as a silicon substrate and an upper layer may be formed of, for example, a semiconductor material or an organic film. For example, a well-known imaging device may be used as the imaging unit 20. In some example embodiments, the NIR imaging pixel 24 may be an imaging pixel that is configured to perform in the visible light wavelength band in addition to the near-infrared wavelength band.

Referring to FIG. 3 again, the near-infrared imaging device 22 outputs image data to the memory 30 or the 3D information calculation unit 50. In addition, the visible light imaging device 21 outputs image data to the memory 40 or the 3D information calculation unit 50.

The memory 30 stores a near-infrared image when the pattern light 2 is projected onto the subject 3 or when the pattern light 2 is not projected onto the subject 3.

The memory 40 stores a visible light image when the pattern light 2 is projected onto the subject 3 or when the pattern light 2 is not projected onto the subject 3.

The 3D information calculation unit 50 calculates 3D data (3D coordinates) of the subject 3 based on the near-infrared image and the visible light image when the pattern light 2 is projected onto the subject 3 and the near-infrared image and the visible light image when the pattern light 2 is not projected onto the subject 3, inputted from the imaging unit 20 and the memories 30 and 40, and outputs the 3D data to the outside of the 3D measurement apparatus 1.

In some example embodiments, the 3D information calculation unit 50 may include a first image difference unit (e.g., near-infrared image difference unit) 51, a second image difference unit (e.g., visible light image difference unit) 52, an image extraction unit 53, and a 3D calculation unit 54.

The near-infrared image difference unit 51 calculate a near-infrared difference image based on subtracting the near-infrared image when the pattern light 2 is not projected from the near-infrared image when the pattern light 2 is projected onto the subject 3, and outputs the near-infrared difference image to the image extraction unit 53.

The visible light image difference unit 52 (also referred to as a second image difference unit) calculates a visible light difference image based on subtracting the visible light image when the pattern light 2 is not projected from the visible light image when the pattern light 2 is projected onto the subject 3, and outputs the visible light difference image to the image extraction unit 53.

The image extraction unit 53 calculates a pattern extraction image based on subtracting the visible light differential image from the near-infrared differential image, and outputs the pattern extraction image to the 3D calculation unit 54.

The 3D calculation unit 54 calculates and outputs 3D data of the subject 3 based on the pattern extracted image. In some example embodiments, the 3D calculation unit 54 may calculate and output the 3D data of the subject 3 based on applying a triangulation method to an amount of a difference between a position of the pattern, for example, a position of a dot pattern in the structured light emitted from the projection unit 10 and a position of the pattern, for example, a position of the dot pattern in the pattern extraction image, an actual distance between the projection unit 10 and the imaging unit 20, and a focal length of the imaging unit 20.

In some example embodiments, each component realized by the 3D information calculation unit 50 may be implemented based on, for example, executing a program under a control of processing circuitry (not shown) provided in the 3D information calculation unit 50. Restated, the 3D information calculation unit 50, and some or all units 51-54 included therein, may be included in, may include, and/or may be implemented by one or more instances of processing circuitry such as hardware including logic circuits, a hardware/software combination such as a processor executing software; or a combination thereof. For example, the processing circuitry may include, but is not limited to, a central processing unit (CPU), an application processor (AP), an arithmetic logic unit (ALU), a graphic processing unit (GPU), a digital signal processor, a microcomputer, a field programmable gate array (FPGA), a System-on-Chip (SoC) a programmable logic unit, a microprocessor, or an application-specific integrated circuit (ASIC), etc. In some example embodiments, the processing circuitry of the 3D information calculation unit 50 may include a non-transitory computer readable storage device, for example a solid state drive (SSD), storing a program of instructions, and a processor coupled to the storage device (e.g., via a bus) and configured to execute the program of instructions to implement the functionality of the 3D information calculation unit 50. Accordingly, a 3D information calculation unit 50 as described herein may be interchangeably referred to as "processing circuitry" that may be configured to implement any and all functionality of any and all of the 3D information calculation unit 50 as described herein.

In some example embodiments, the 3D information calculation unit 50 may be realized based on loading a program stored in a storage device (not shown) into a main memory (not shown) and executing the program under a control of the processing circuitry. Each component is not limited to being realized by software by a program, and may be realized by any combination of hardware, firmware, and software.

In some example embodiments, the program may be supplied to the 3D information calculation unit 50 with being stored in various types of non-transitory computer readable media. The non-transitory computer readable media may include various types of tangible storage media. Examples of the non-transitory computer-readable media include a magnetic recording medium (for example, a flexible disk, a magnetic tape, or a hard disk drive), a magneto-optical recording medium (for example, a magneto-optical disk), a CD-ROM (Read Only Memory), a CD-R, a CD-R/W, and a semiconductor memory (for example, a mask ROM, a PROM (Programmable ROM), an EPROM (Erasable PROM), a flash ROM, or a RAM (random access memory)).

In some example embodiments, the program may be supplied to the 3D information calculation unit 50 by various types of temporary computer readable media. Examples of the transitory computer readable media include an electrical signal, an optical signal, and an electromagnetic wave. The temporary computer-readable media may supply the program to the 3D information calculation unit 50 via a wired communication path such as an electric wire or an optical fiber, or a wireless communication path.

Next, an operation of the 3D information calculation apparatus (3D information calculation unit 50) according to some example embodiments, i.e., a 3D information calculation method is described based on a 3D measurement method including the 3D information calculation method.

Figure 5:
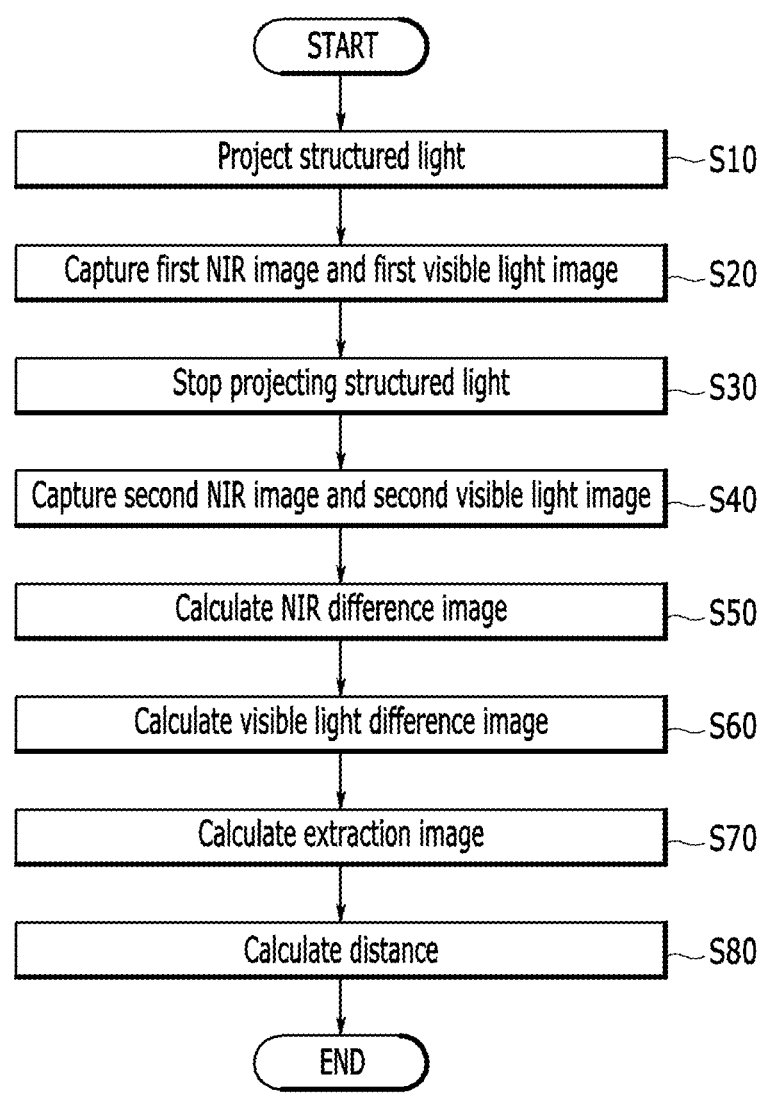
FIG. 5 is a flowchart showing a 3D measurement method according to some example embodiments.
Figure 6:
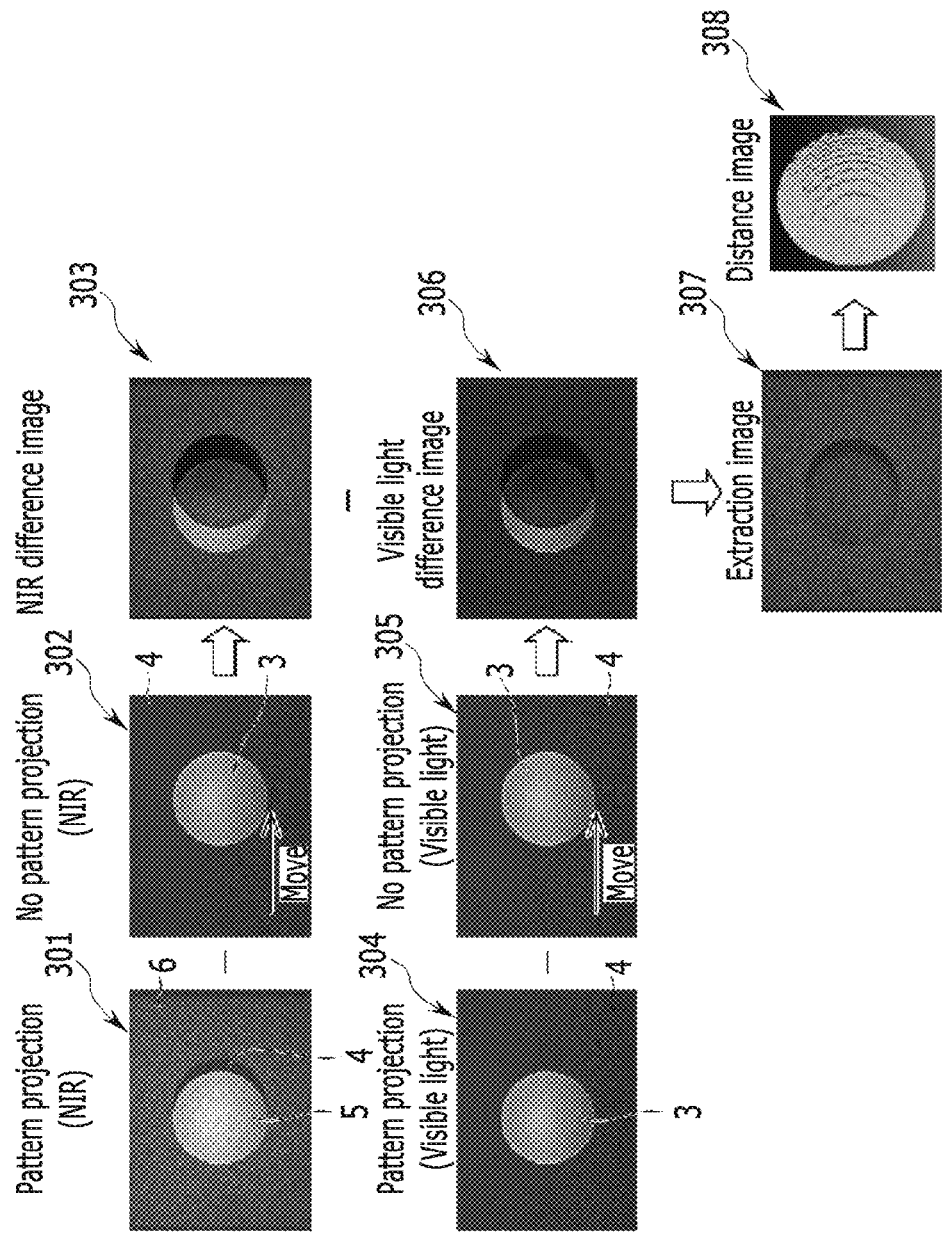
FIG. 6 is a diagram for explaining processing of the 3D measurement method according to some example embodiments.

FIG. 5 is a flowchart showing a 3D measurement method according to some example embodiments, and FIG. 6 is a diagram for explaining processing of the 3D measurement method according to some example embodiments. It will be understood that some or all of the operations shown in FIG. 5 may be implemented by processing circuitry that implements the 3D information calculation unit 50.

Referring to FIG. 5 and FIG. 6, when a projection unit 10 projects pattern light 2 (e.g., structured light) in operation S10, an imaging unit 20 captures a near-infrared image (first near-infrared image) 301 and a visible light image (first visible light image 304) in operation S20. Accordingly, a first image of a first wavelength band (e.g., a near infrared wavelength band) and a second image of a second wavelength band (e.g., a visible wavelength band) may be received at a same time and a same angle of view, based on a subject being imaged concurrently with structured light of the first wavelength band (e.g., pattern light of the near-infrared wavelength band) being projected on to the subject. In some example embodiments, the imaging unit 20 may convert the visible light image into a gray scale image.

Accordingly, a sphere 5 and wall 6 on which the pattern is projected, and a wall 4 on which the pattern is not projected appear in the near-infrared image 301. Further, a sphere 3 and wall 4 on which the pattern is not projected appear in the visible light image 304. The pattern of the near-infrared wavelength band does not appear in the visible light image 304.

When the projection unit 10 stops projecting the pattern light 2 in operation S30, the imaging unit 20 captures a near-infrared image (second near-infrared image) 302 and a visible light image (second visible light image) in operation S40. In some example embodiments, the imaging unit 20 may convert the visible light image into a gray scale image. Accordingly, a third image of the first wavelength band (e.g., the near infrared wavelength band) and a fourth image of the second wavelength band (e.g., the visible wavelength band) may be received at a same time and a same angle of view, based on the subject being imaged concurrently with structured light of the first wavelength band (e.g., pattern light) not being projected on to the subject.

Therefore, the sphere 3 and wall 4 on which the pattern is not projected appear in both the near-infrared image 302 and the visible light image 305. In addition, as can be clearly seen in each image, the sphere 3 moves from left to right in front of the imaging unit 20 during a period from a time when the near-infrared image 301 and the visible light image 304 are captured to a time when the near-infrared image 302 and the visible light image 305 are captured.

In operation S50, a near-infrared image difference unit 51 calculates a near-infrared difference image 303 (e.g., first difference image of the first wavelength band) based on subtracting the near-infrared image 302 when the pattern light 2 is not projected (e.g., the third image) from the near-infrared image 301 when the pattern light 2 is projected (e.g., the first image), thereby subtracting the first image and the third image.

Similar to the near-infrared difference image 203 shown in FIG. 2, an unnecessary luminance difference appears in the background of the pattern so that the pattern cannot be properly extracted based on a binarization process. Accordingly, an accurate distance image of the sphere 3 cannot be acquired from the near-infrared difference image 203.

In operation S60, a visible light image difference unit 52 calculates a visible light difference image 306 (e.g., second difference image of the second wavelength band) based on subtracting the visible light image 305 when the pattern light 2 is not projected (e.g., the fourth image) from the visible light image 304 when the pattern light 2 is projected (e.g., the second image), thereby subtracting the second image and the fourth image. A luminance difference being the same as that of the near-infrared difference image 303 also appears in the visible light difference image 306.

In operation S70, an image extraction unit 53 calculates a pattern extraction image (extraction image) 307 based on subtracting the visible light difference image 306 (e.g., second difference image) from the near-infrared difference image 303 (e.g., first difference image), thereby subtracting the first difference image and the second difference image. As described above, since the same luminance difference exists in the near-infrared difference image 303 and the visible light difference image 306, a difference between the images due to the movement of the sphere 3 may be compensated based on subtracting one image from the other image. As a result, the background of the pattern becomes the same so that the pattern can be easily extracted based on the binarization process.

In operation S80, a 3D calculation unit 54 applies a triangulation method to the pattern extraction image 307 to properly calculate and output a distance to the sphere 3 or 3D data of the sphere 3. Accordingly, the sphere 3 can be accurately reconstructed in a distance image 308. Thus, a distance to the subject (e.g., sphere 3) may be calculated based on the extraction image (pattern extraction image 307). It will be understood that, in some example embodiments, the distance may be calculated via a method other than application of a triangulation method to the pattern extraction image 307. In some example embodiments, the calculated distance to the subject may be used to adjust a focus of a camera to increase the focus and/or resolution of a captured image of the subject, determine a navigation path to navigate a vehicle in relation to the subject, or the like.

As described above, the 3D information calculation apparatus and the 3D information calculation method according to some example embodiments can exclude the influence of ambient light and compensate for the difference in the images caused by a movement of the subject or a camera shake so that the distance to the subject can be accurately calculated.

In addition, various modifications or variations can be made in the 3D information calculation apparatus and the 3D information calculation method according to some example embodiments.

For example, although some example embodiments uses, as the imaging unit 20, the imaging device in which the near-infrared imaging pixels 24 that perform imaging in the near-infrared wavelength band are stacked on visible light imaging pixels 23 that perform imaging in the visible light wavelength band, an imaging device in which the visible light imaging pixels and the near-infrared imaging pixels are arranged on the same layer may be used as an imaging unit.

Figure 7:
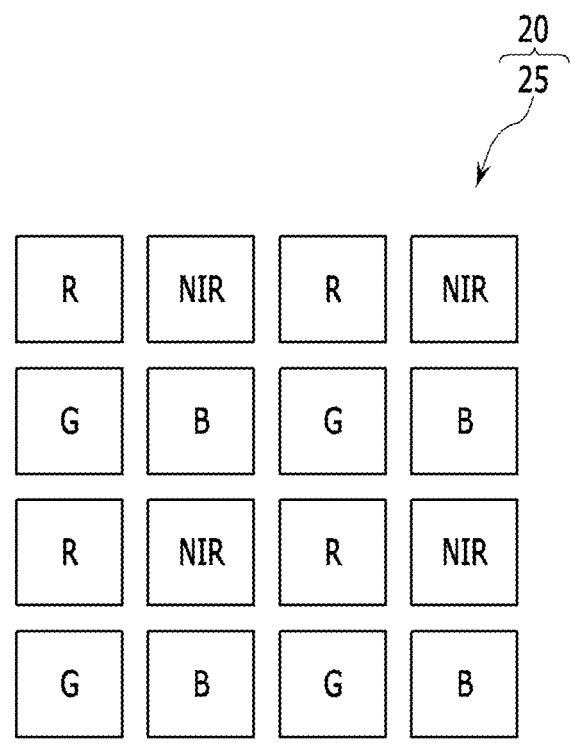
FIG. 7 is a diagram for explaining an imaging unit according to some example embodiments.

FIG. 7 is a diagram for explaining an imaging unit 25 according to some example embodiments, and shows an enlarged view of a part of an imaging surface in the imaging unit 25. The imaging unit 25 shown in FIG. 7 may be included in the imaging device ("imaging unit 20") shown in FIG. 4 in some example embodiments.

An imaging device in which G imaging pixels of odd-numbered or even-numbered rows in the Bayer array are replaced with NIR imaging pixels and the NIR imaging pixels and RGB imaging pixels are arranged on the same layer may be used. In some example embodiments, the well-known imaging device may be used as such an imaging device.

Further, although an example in which the random dot pattern is used as the structured light has been described in some example embodiments, in some example embodiments, a slit pattern, a gray code pattern, or the like may be used as the structured light.

Furthermore, the 3D measurement apparatus 1 is not limited to a smartphone, but, in some example embodiments, may be various information processing apparatuses including an imaging unit such as a digital camera. In some example embodiments, the 3D measurement apparatus 1 may be provided with a 3D imaging device or a distance image acquisition device, or may be provided with a 3D measurement system including a projection device, an imaging device, or a 3D information calculation device. In some example embodiments, the 3D information calculation device may include an image input unit for inputting each image.

In addition, in some example embodiments, it has been described that the imaging is performed when the structured light is not projected after the imaging is performed when the structured light is projected. However, in some example embodiments, the imaging may be performed when the structured light is projected after the imaging is performed when the structured light is not projected.

Further, in some example embodiments, it has been described that the visible light imaging device 21 directly converts the captured visible light image into the gray scale image. However, in some example embodiments, after only an image of the red wavelength band close to the near-infrared wavelength band is extracted from the visible light image, the extracted image may be converted into a gray scale image. Such extraction and conversion may be performed by the imaging unit 20 to generate each of the second image and the fourth image. Then, a movement component of the subject can be compensated more appropriately. Accordingly, in some example embodiments, each of the second image and the fourth image may be received based on extracting an image of a red wavelength band being extracted from an image that is obtained based on imaging a subject (e.g., sphere 3) in a visible light wavelength band, and converting the image of the red wavelength band into a gray scale image.

Furthermore, although a case where the subject moves between imaging when the structured light is projected and imaging when the structured light is not projected has been described in the present inventive concepts, in some example embodiments, a case where an imaging unit moves by a hand movement between the twice imaging may be processed in the same way.

Although it has been described in some example embodiments that the structured light in the near-infrared wavelength band is used, in some example embodiments, structured light in the visible light wavelength band, for example, structured light in the red wavelength band, green wavelength band, or blue wavelength band may be used. Restated, the first wavelength band, which is described with reference to at least FIG. 7 as being a near-infrared wavelength band, may in some example embodiments be a wavelength band of a first color in a visible light wavelength band, and the second wavelength band may be aa wavelength band of a second color that is different from the first color in the visible light wavelength band.

In some example embodiments, for example, structured light of a first color (e.g., blue) wavelength band may be projected onto a subject, and an image of the blue wavelength band and an image of a second color (e.g., red) wavelength band at the same time and the same angle of view may be captured when the structured light is projected. Further, an image of the blue wavelength band and an image of the red wavelength band at the same time and the same angle of view may be captured when the structured light is not projected. A difference image of the blue wavelength band may be calculated based on subtracting the image of the blue wavelength band when the structured light is not projected from the image of the blue wavelength band when the structured light is projected. A difference image of the red wavelength band may be calculated based on subtracting the image of the red wavelength band when the structured light is not projected from the image of the red wavelength band when the structured light is projected. An extraction image may be calculated based on subtracting the difference image of the red wavelength band from the difference image of the blue wavelength band, and a distance to the subject may be calculated based on the extraction image.

Then, the 3D information calculation apparatus and the 3D information calculation method according to some example embodiments can be realized by using a conventional imaging device.

In some example embodiments, structured light in a wavelength band other than the near-infrared wavelength band or the visible light wavelength band may be used.

As described above, a 3D information calculation unit 50 according to some example embodiments includes an image input unit that receives a first image of a first wavelength band and a second image of a second wavelength band different from the first wavelength at a same time and a same angle of view, and a third image of the first wavelength band and a fourth image of the second wavelength band at a same time and a same angle of view, the first image and the second image being obtained based on imaging a subject when structured light of the first wavelength band is projected, and the third image and the fourth image being obtained based on imaging the subject when the structured light is not projected; a first image difference unit 51 that calculates a first difference image of the first wavelength band based on subtracting the first image and the third image; a second image difference unit 52 that calculates a second difference image of the second wavelength band based on subtracting the second image and the fourth image; an image extraction unit 53 that calculates an extraction image based on subtracting the first difference image and the second difference image; and a 3D calculation unit 54 that calculates a distance to the subject based on the extraction image.

In some example embodiments, the first wavelength band may include a near-infrared wavelength band, and the second wavelength band may include a visible light wavelength band.

Accordingly, it possible to accurately measure the distance to the subject based on excluding the influence of ambient light and compensating for the difference in the images caused by the movement of the subject or the camera shake.

In some example embodiments, the second image and the fourth image may be images each obtained based on extracting an image of a red wavelength band from an image obtained based on imaging the subject in the visible light wavelength band and converting the image of the red wavelength band into a gray scale image.

In some example embodiments, the first wavelength band may include a wavelength band of a first color in a visible light wavelength band, and the second wavelength band may include a wavelength band of a second color different from the first color in the visible light wavelength band.

In some example embodiments, the first color may be blue, and the second color may be red.

In some example embodiments, the 3D calculation unit may calculate the distance to the subject based on applying a triangulation method to the extraction image.

In some example embodiments, the 3D calculation unit may calculate the distance to the subject based on a difference between a position of a pattern in the structured light and a position of the pattern in the extraction image, a distance between a projection device that projects the structured light and an imaging device that images the subject, and a focal length of the imaging device.

Further, a 3D measurement apparatus 1 according to some example embodiments includes a projection device 10 that projects structured light of a first wavelength band onto a subject; an imaging device 20 that captures a first image of a first wavelength band and a second image of a second wavelength band different from the first wavelength at a same time and a same angle of view when the structured light is projected, and captures a third image of the first wavelength band and a fourth image of the second wavelength band at a same time and a same angle of view when the structured light is not projected; a first image difference unit 51 that calculates a first difference image of the first wavelength band based on subtracting the first image and the third image; a second image difference unit 52 that calculates a second difference image of the second wavelength band based on subtracting the second image and the fourth image; an image extraction unit 53 that calculates an extraction image based on subtracting the first difference image and the second difference image; and a 3D calculation unit 54 that calculates a distance to the subject based on the extraction image.

Accordingly, it possible to accurately measure the distance to the subject based on excluding the influence of ambient light and compensating for the difference in the images caused by the movement of the subject or the camera shake.

In some example embodiments the imaging device 20 of the 3D measurement apparatus 1 may include a visible light imaging device 21 that is configured to perform imaging in the visible light wavelength band and a near-infrared imaging device 22 that is configured to perform imaging in the near-infrared wavelength band, the visible light imaging device 21 and the near-infrared imaging device 22 being stacked.

Accordingly, it is possible to easily capture the near-infrared image and the visible light image at the same time and the same angle of view.

In some example embodiments, the imaging unit 25 (also referred to as an imaging device) of the 3D measurement apparatus 1 may include a visible light imaging device that is configured to perform imaging in the visible light wavelength band and a near-infrared imaging device that is configured to perform imaging in the near-infrared wavelength band, the visible light imaging device and the near-infrared imaging device being arranged in a same layer (e.g., not stacked but substantially coplanar in a same plane).

Accordingly, it is possible to easily capture the near-infrared image and the visible light image at the same time and the same angle of view.

Furthermore, a 3D information calculation method according to some example embodiments includes receiving a first image of a first wavelength band and a second image of a second wavelength band different from the first wavelength at a same time and a same angle of view, and a third image of the first wavelength band and a fourth image of the second wavelength band at a same time and a same angle of view, the first image and the second image being obtained based on imaging a subject when structured light of the first wavelength band is projected, and the third image and the fourth image being obtained based on imaging the subject when the structured light is not projected; calculating a first difference image of the first wavelength band based on subtracting the first image and the third image (S50); calculating a second difference image of the second wavelength band based on subtracting the second image and the fourth image (S60); calculating an extraction image based on subtracting the first difference image and the second difference image (S70); and calculating a distance to the subject based on the extraction image (S80).

Accordingly, it possible to accurately measure the distance to the subject based on excluding the influence of ambient light and compensating for the difference in the images caused by the movement of the subject or the camera shake.

In addition, a 3D information calculation program according to some example embodiments causes a computing device to receiving a first image of a first wavelength band and a second image of a second wavelength band different from the first wavelength at a same time and a same angle of view, and a third image of the first wavelength band and a fourth image of the second wavelength band at a same time and a same angle of view, the first image and the second image being obtained based on imaging a subject when structured light of the first wavelength band is projected, and the third image and the fourth image being obtained based on imaging the subject when the structured light is not projected; calculating a first difference image of the first wavelength band based on subtracting the first image and the third image (S50); calculating a second difference image of the second wavelength band based on subtracting the second image and the fourth image (S60); calculating an extraction image based on subtracting the first difference image and the second difference image (S70); and calculating a distance to the subject based on the extraction image (S80).

Accordingly, it possible to accurately measure the distance to the subject based on excluding the influence of ambient light and compensating for the difference in the images caused by the movement of the subject or the camera shake.

While some example embodiments have been described in connection with reference to some example embodiments, it is to be understood that the example embodiments of the inventive concepts are not limited to the disclosed example embodiments. On the contrary, the example embodiments are intended to cover various modifications and equivalent arrangements included within the spirit and scope of the appended claims.

What is claimed is:

1. A 3D information calculation apparatus, comprising:

processing circuitry configured to receive a first image of a first wavelength band and a second image of a second wavelength band different from the first wavelength band at a same time and a same angle of view, the first image and the second image being received based on a subject being imaged concurrently with structured light of the first wavelength band being projected on to the subject;

receive a third image of the first wavelength band and a fourth image of the second wavelength band at a same time and a same angle of view, the third image and the fourth image being received based on the subject being imaged concurrently with the structured light not being projected on to the subject;

calculate a first difference image of the first wavelength band based on subtracting the first image and the third image;

calculate a second difference image of the second wavelength band based on subtracting the second image and the fourth image;

calculate an extraction image based on subtracting the first difference image and the second difference image; and calculate a distance to the subject based on the extraction image.

2. The 3D information calculation apparatus of claim 1, wherein the first wavelength band includes a near-infrared wavelength band, and the second wavelength band includes a visible light wavelength band.

3. The 3D information calculation apparatus of claim 2, wherein the second image and the fourth image are each received based on an image of a red wavelength band being extracted from an image that is obtained based on imaging the subject in the visible light wavelength band, and converting the image of the red wavelength band into a gray scale image.

4. The 3D information calculation apparatus of claim 1, wherein the first wavelength band includes a wavelength band of a first color in a visible light wavelength band, and the second wavelength band includes a wavelength band of a second color different from the first color in the visible light wavelength band.

5. The 3D information calculation apparatus of claim 4, wherein the first color is blue and the second color is red.

6. The 3D information calculation apparatus of claim 1, wherein the processing circuitry is configured to calculate the distance to the subject based on applying a triangulation method to the extraction image.

7. The 3D information calculation apparatus of claim 1, wherein the processing circuitry is configured to calculate the distance to the subject based on a difference between a position of a pattern in the structured light and a position of the pattern in the extraction image, a distance between a projection device that projects the structured light and an imaging device that images the subject, and a focal length of the imaging device.

8. A 3D measurement apparatus, comprising:

a projection device configured to project structured light of a first wavelength band onto a subject;

an imaging device configured to capture a first image of the first wavelength band and a second image of a second wavelength band different from the first wavelength band at a same time and a same angle of view concurrently with the structured light being projected onto the subject, and capture a third image of the first wavelength band and a fourth image of the second wavelength band at a same time and a same angle of view concurrently with the structured light being not projected onto the subject; and processing circuitry configured to
calculate a first difference image of the first wavelength band based on subtracting the first image and the third image,
calculate a second difference image of the second wavelength band based on subtracting the second image and the fourth image,
calculate an extraction image based on subtracting the first difference image and the second difference image, and
calculate a distance to the subject based on the extraction image.

9. The 3D measurement apparatus of claim 8, wherein
the first wavelength band includes a near-infrared wavelength band, and
the second wavelength band includes a visible light wavelength band.

10. The 3D measurement apparatus of claim 9, wherein the imaging device is configured to generate each of the second image and the fourth image based on extracting an image of a red wavelength band from an image obtained based on imaging the subject in the visible light wavelength band and converting the image of the red wavelength band into a gray scale image.

11. The 3D measurement apparatus of claim 9, wherein the imaging device includes
a visible light imaging device configured to perform imaging in the visible light wavelength band, and
a near-infrared imaging device configured to perform imaging in the near-infrared wavelength band, the visible light imaging device and the near-infrared imaging device being stacked.

12. The 3D measurement apparatus of claim 9 wherein the imaging device includes
a visible light imaging device configured to perform imaging in the visible light wavelength band, and
a near-infrared imaging device configured to perform imaging in the near-infrared wavelength band, the visible light imaging device and the near-infrared imaging device being arranged in a same layer.

13. The 3D measurement apparatus of claim 8, wherein the first wavelength band includes a wavelength band of a first color in a visible light wavelength band, and
the second wavelength band includes a wavelength band of a second color different from the first color in the visible light wavelength band.

14. The 3D measurement apparatus of claim 13 wherein the first color is blue and the second color is red.

15. The 3D measurement apparatus of claim 8, wherein the processing circuitry is configured to calculate the distance to the subject based on applying a triangulation method to the extraction image.

16. The 3D measurement apparatus of claim 8, wherein the processing circuitry is configured to calculate the distance to the subject based on
a difference between a position of a pattern in the structured light and a position of the pattern in the extraction image,
a distance between the projection device and the imaging device, and
a focal length of the imaging device.

17. A 3D information calculation method, the method comprising:
receiving a first image of a first wavelength band and a second image of a second wavelength band different from the first wavelength band at a same time and a same angle of view, the first image and the second image being received based on a subject being imaged concurrently with structured light of the first wavelength band being projected on to the subject;
receiving a third image of the first wavelength band and a fourth image of the second wavelength band at a same time and a same angle of view, the third image and the fourth image being received based on the subject being imaged concurrently with the structured light not being projected on to the subject;
calculating a first difference image of the first wavelength band based on subtracting the first image and the third image;
calculating a second difference image of the second wavelength band based on subtracting the second image and the fourth image;
calculating an extraction image based on subtracting the first difference image and the second difference image; and
calculating a distance to the subject based on the extraction image.

18. The 3D information calculation method of claim 17, wherein
the first wavelength band includes a near-infrared wavelength band, and
the second wavelength band includes a visible light wavelength band.

19. A non-transitory computer readable medium storing a 3D information calculation program that, when executed by a computing device, causes the computing device to:
receive a first image of a first wavelength band and a second image of a second wavelength band different from the first wavelength band at a same time and a same angle of view, the first image and the second image being received based on a subject being imaged concurrently with structured light of the first wavelength band being projected on to the subject;
receive a third image of the first wavelength band and a fourth image of the second wavelength band at a same time and a same angle of view, the third image and the fourth image being received based on the subject being imaged concurrently with the structured light not being projected on to the subject;
calculate a first difference image of the first wavelength band based on subtracting the first image and the third image;
calculate a second difference image of the second wavelength band based on subtracting the second image and the fourth image;
calculate an extraction image based on subtracting the first difference image and the second difference image; and
calculate a distance to the subject based on the extraction image.

20. The non-transitory computer readable medium of claim 19, wherein
the first wavelength band includes a near-infrared wavelength band, and
the second wavelength band includes a visible light wavelength band.

* * * * *